United States Patent [19]

Bennett

[11] Patent Number: 5,687,052
[45] Date of Patent: Nov. 11, 1997

[54] FLEXIBLE VARIABLE POLE-COUNT RELAY OUTPUT CIRCUIT FOR CONTROLLING MULTIPLE RELAYS

[75] Inventor: Steven Brad Bennett, Manitowoc, Wis.

[73] Assignee: Paragon Electric Company, Inc., Two Rivers, Wis.

[21] Appl. No.: 615,391

[22] Filed: Mar. 14, 1996

[51] Int. Cl.$^6$ ................................................ H01H 47/00
[52] U.S. Cl. .................... 361/190; 361/166; 361/191; 307/29; 307/38; 307/115
[58] Field of Search .................. 361/189–191, 361/166; 307/29, 38, 113–115, 116, 125

[56] References Cited

U.S. PATENT DOCUMENTS

| | | | |
|---|---|---|---|
| 3,502,945 | 3/1970 | Bentley et al. | 361/166 |
| 4,338,649 | 7/1982 | Mosier | 361/139 |
| 4,384,314 | 5/1983 | Doty et al. | 361/160 |
| 4,719,532 | 1/1988 | Schneider | 361/189 |
| 4,890,001 | 12/1989 | Eickelmann | 307/38 |
| 5,436,788 | 7/1995 | Wallaert | 361/160 |
| 5,442,511 | 8/1995 | Morey et al. | 361/154 |

*Primary Examiner*—Jeffrey A. Gaffin
*Assistant Examiner*—Michael J. Sherry
*Attorney, Agent, or Firm*—Foley & Lardner

[57] ABSTRACT

A controller for controlling equipment in response to control signals received by the controller. The controller includes control line inputs, a switching arrangement, control outputs and binary switching devices. The switching arrangement is configured to selectively couple each control line input to either zero, one or more than one control output. The binary switching devices may be configured as relays to control the application of an electrical signal, such as a power line input, to electrical devices. A single control signal may control the application of multiple phases of power to one electrical device or control the application of power to several electrical devices. The binary switching devices may also be configured as solenoids coupled to mechanical devices such as valves.

23 Claims, 8 Drawing Sheets

FLEXIBLE VARIABLE POLE-COUNT RELAY OUTPUT CIRCUIT FOR CONTROLLING MULTIPLE RELAYS

FIELD OF THE INVENTION

The invention generally relates to a controller for controlling equipment in response to control signals received by the controller. The invention particularly relates to a controller including control line inputs, a switching arrangement, control outputs and binary switching devices wherein the switching arrangement is configured to selectively couple each control line input to either zero, one or more than one control output, and each control output actuates a binary switching device to control the equipment.

BACKGROUND OF THE INVENTION

Many applications include an electrical controller which provides signals to control equipment including one or more electrical devices. For example, an energy management and control unit (EMU) typically includes a controller for providing control signals to control the application of electrical power to heating, ventilation and air-conditioning equipment (HVAC), indoor and outdoor lighting, refrigeration and other types of equipment. In a typical installation of equipment, an EMU manages and controls the application of power to a number of electrical devices of different types and with different control requirements.

Electrical controllers typically provide control signals to the windings or coils of electrical relays to control the application of electrical power to the electrical devices being controlled. Often, the electrical power is supplied by power line inputs. The relay configuration used to control the application of electrical power depends on the type of equipment being controlled. For example, one-phase equipment such as an electrical lamp is controlled using a single-pole, double-throw relay. Two-phase equipment such as a heater is controlled using a double-pole, double-throw relay. Three-phase equipment such as a three-phase motor is controlled using a triple-pole, double-throw relay. The use of different pole-count relay configurations for controlling different types of equipment increases the cost and complexity of known control systems.

Controllers can also be configured to provide control signals to the windings or coils of solenoids coupled to mechanical devices. For example, an apparatus can include a controller configured to selectively energize the winding of a solenoid coupled to a valve. Energizing the solenoid coil can either open or close the valve to control the flow of fluid through the valve. Apparatus or installations of equipment typically include various combinations of controlled relays and solenoids.

In many situations, control systems provide a limited number of control signals to control the equipment or apparatus according to user-defined requirements. The control signals may be programmable. For example, a user can program an EMU with a time-of-day schedule to allow the EMU to schedule the application of power to various pieces of equipment according to the time of day. This type of system allows a user to regulate peak power usage by shutting off or shedding non-critical loads during peak demand periods. A user may also use this type of system to time-shift power usage by non-critical equipment to take advantage of lower utility rates during certain periods. For example, a user could program an EMU to schedule power to a water heater during off-peak hours. The heated water can be stored in an insulated holding tank to provide hot water during peak hours, resulting in a savings in the user's energy costs.

An apparatus or installation of equipment may include various electrical devices controlled according to different schedules, and may also include subsets of devices controlled according to the same schedules. For example, an EMU may be programmed to control power to a one-phase lamp and a two-phase heater according to identical time-of-day schedules and to control a one-phase air handler unit according to a different time-of-day schedule. Using common control signals to control the application of power to different electrical devices according to the same schedule is often complicated by the need to isolate the power line inputs required by each device. For example, the power line inputs to a one-phase lamp are typically isolated from the power line inputs to a two-phase heater. The use of separate control signals to control the application of power to different pieces of equipment with identical schedules increases the cost and complexity of existing control systems due to the limited number of available control channels in a typical system and due to extra wiring requirements.

In one type of control circuit for actuating a number of electrical devices in accordance with a number of control input sources, a user-actuatable matrix switch couples the control input sources to the coils of a number of relays which control electrical devices. This type of circuit provides the user with the ability to control the same relay using more than one control input source since a matrix switch allows any number of columns to be connected to the same row. However, the circuit does not provide the user with the ability to control more than one relay using the same control input source since a matrix switch does not allow one column to be connected to multiple rows.

Accordingly, it would be desirable to provide a flexible and variable pole-count switch output circuit for controlling multiple switches. It would also be desirable to provide an electrical controller for controlling electrical equipment powered by a variable number of power phases using ganged single-pole relays under common control. It would further be desirable to provide a controller for controlling electrical equipment wherein one control signal controls the application of multiple phases of electrical power to one electrical device, or controls the application of electrical power to more than one electrical device. Further, it would be desirable to provide a controller wherein one control signal can actuate different types of electrically-actuatable switches including solenoids, relays or a combination of solenoids and relays.

SUMMARY OF THE INVENTION

In one embodiment, the invention relates to an electrical controller for controlling electrical equipment in accordance with a plurality of control signals received by the controller. The controller includes a plurality of control line inputs coupled to the control signals, a switching arrangement coupled to the control line inputs and a plurality of control outputs coupled to the switching arrangement. The switching arrangement is configured to selectively couple each control line input to either zero, one or more than one control output. The controller also includes a plurality of binary switching devices coupled to the control outputs and to the electrical equipment, each binary switching device being actuatable in response to one of the control outputs and configured to control the application of an electrical signal to the electrical equipment.

In another embodiment, the invention relates to an electrical controller for controlling equipment in accordance with a plurality of control signals received by the controller. The controller includes a plurality of control line inputs coupled to the control signals, a switching arrangement coupled to the control line inputs and a plurality of control outputs coupled to the switching arrangement wherein the switching arrangement is configured to selectively couple each control line input to either zero, one or more than one control output. The controller also includes a plurality of binary switching devices coupled to the control outputs and to the equipment, each binary switching device being actuatable in response to one of the control outputs and configured to control the equipment.

In still another embodiment, the invention relates to an electrical controller for controlling a plurality of electrical devices, each electrical device controlled in accordance with one input selected from a plurality of inputs. The controller includes a means for selectively coupling each input to either zero, one or more than one control output. The controller also includes a plurality of output means for generating electrical signals applied to the electrical devices in response to the control outputs.

BRIEF DESCRIPTION OF THE DRAWINGS

The invention will become more fully understood from the following detailed description of the preferred embodiment thereof, taken in conjunction with the accompanying drawings, wherein like reference numerals refer to like parts, in which.

DETAILED DESCRIPTION OF THE PREFERRED EMBODIMENT

Figure 1:
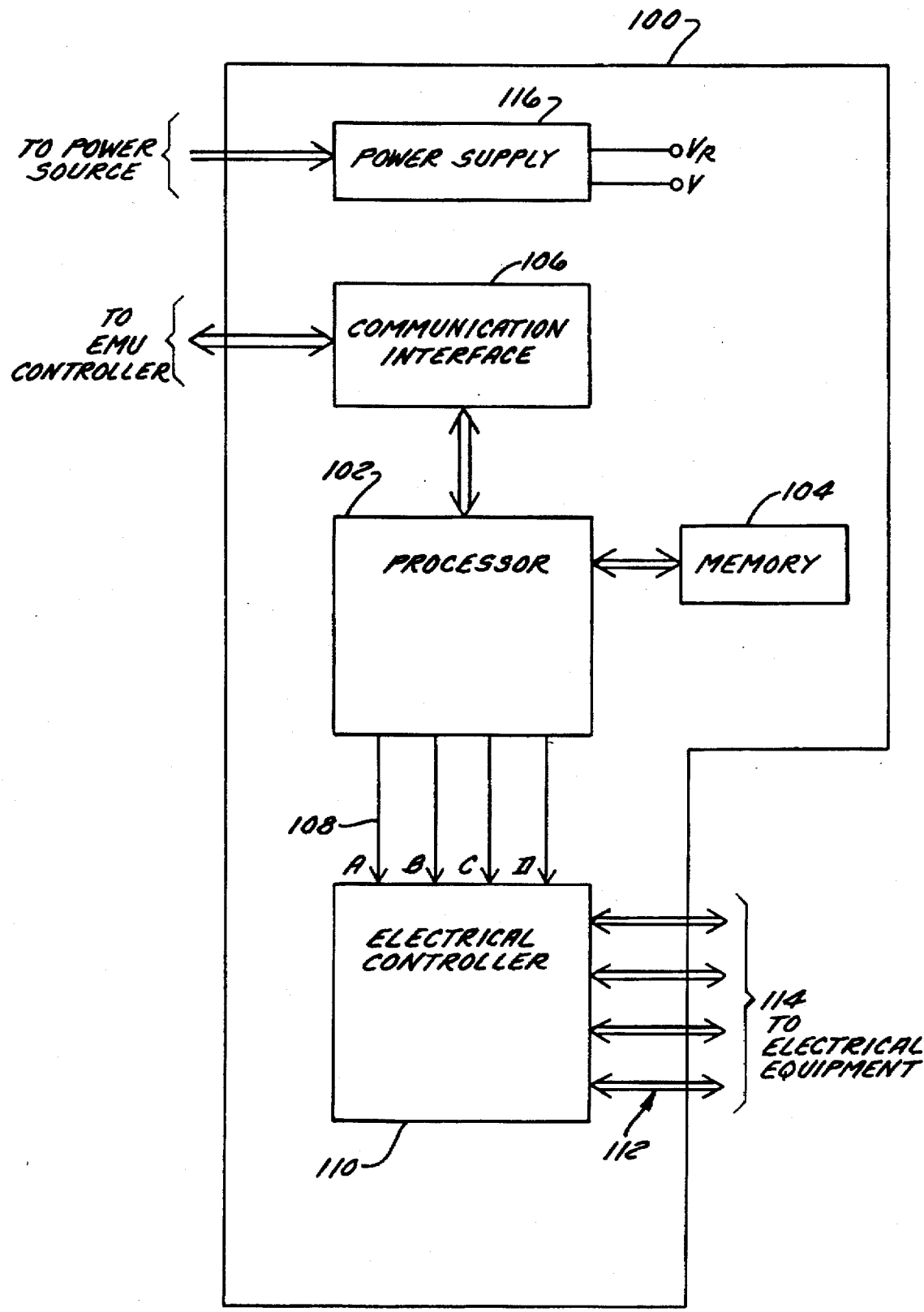
FIG. 1 is a block diagram of a relay output module, including an electrical controller, used in an energy management and control system.

Referring to FIG. 1, a relay output module 100 for use in an energy management and control unit (EMU) includes a processor 102 and an associated memory 104 which communicate to an EMU controller (not shown) through a communication interface 106. Processor 102 is typically a microprocessor or microcontroller, and, by way of example, is a Motorola MC143150 ("3150") microprocessor in a preferred embodiment. The 3150 microprocessor includes two built-in processors dedicated to communicate across a local network using the LONTALK network protocol by executing firmware provided by Echelon and stored in memory 104. The 3150 microprocessor also includes a third built-in processor dedicated to execute application code written by a user and also stored in memory 104. The application processor is programmed to receive commands from the EMU controller and to use the commands to control the 3150's input and output pins to generate control signals 108. The application processor is programmable using Echelon's LONBUILDER Developer's Workbench and the application program will vary depending upon the interfacing requirements of the EMU controller. Memory 104 is a 27C256 EEPROM in a preferred embodiment.

Processor 102 is programmed to generate control signals 108 in response to commands received from the EMU controller. In the exemplary embodiment shown in FIG. 1, processor 102 generates four control signals designated A through D. Control signals 108 are input to and used by electrical controller 110 to control the application of electrical signals 112 to electrical equipment 114 (not shown in FIG. 1) as explained in detail below.

Relay output module 100 may also include a power supply 116 which receives power from a power source (not shown) and generates voltages required by relay output module 100. In a preferred embodiment, power supply 116 generates a 24V relay voltage $V_R$ and a 5V supply voltage for other electrical circuitry.

In operation, an EMU controller programmed with time-of-day schedule data converts the data into commands which are transmitted to relay output module 100 via communication interface 106. When a command is received, processor 102 interprets the command to determine which, if any, control signals 108 should be activated. To accommodate an EMU system configured with multiple output modules, the EMU controller may also transmit address data to identify the particular Output module being addressed. Processor 102 compares the address data to its own address to determine whether relay output module 100 is being addressed, and generates control signals 108 only if the addresses match.

Processor 102 shown in FIG. 1 is only one example of a circuit for generating control signals 108. Other circuits for generating control signals 108 can be used to control equipment. For example, processor 102 could generate control signals 108 based on data stored in memory 104, based on internal data stored in processor 102 or based on data received from a device other than an EMU controller. Processor 102 could be eliminated and control signals 108 could be generated by a different control circuit or by user-actuatable switches. Power supply 116 could be eliminated. FIG. 1 illustrates an exemplary use of electrical controller 110.

Figure 2:
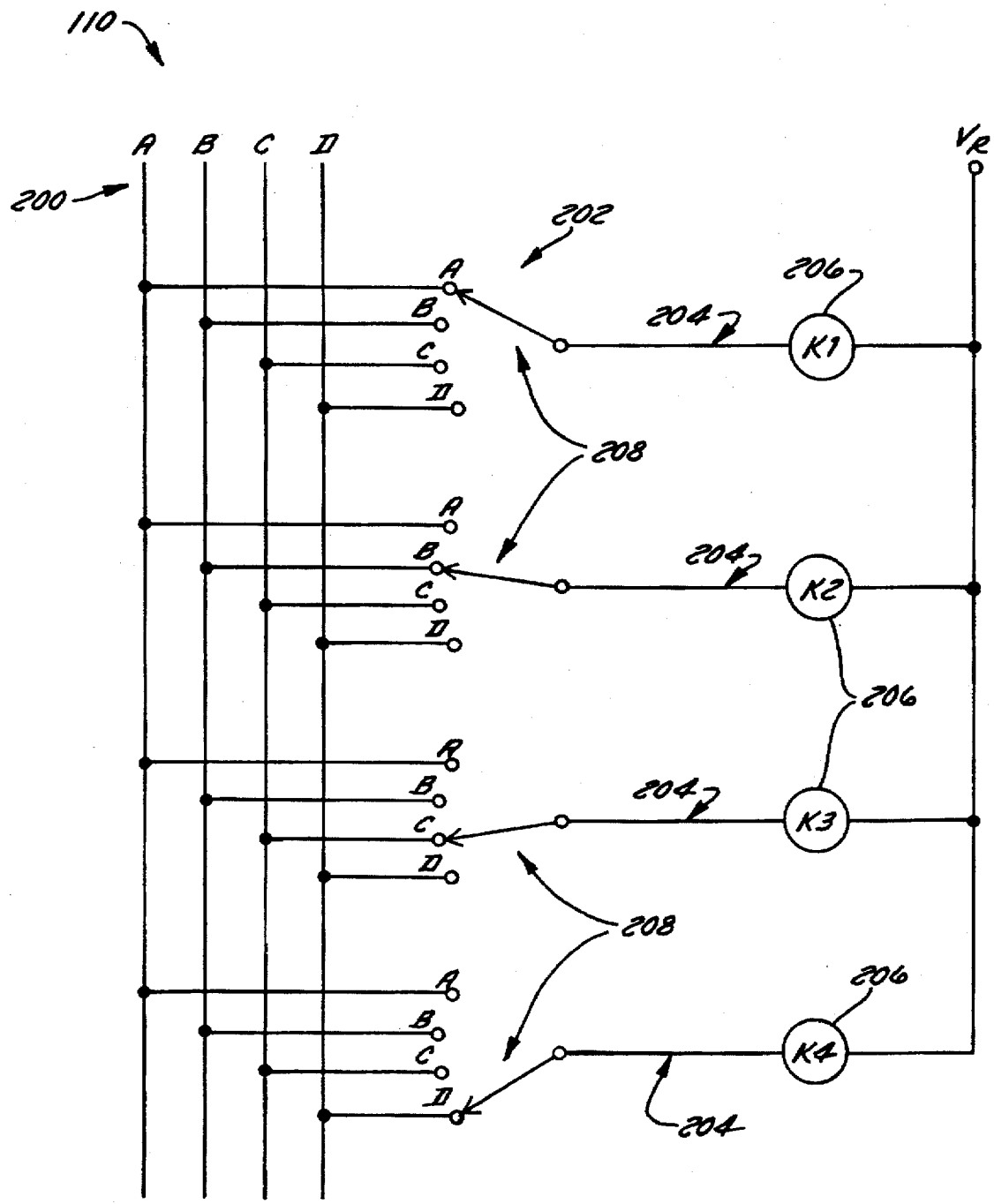
FIG. 2 is a block diagram of the electrical controller shown in FIG. 1.

As shown in the block diagram of FIG. 2, electrical controller 110 includes a plurality of control line inputs 200, a switching arrangement 202, a plurality of control outputs 204 and a plurality of relays 206. The control line inputs 200 are coupled to the control signals 108 output by processor 102 and shown in FIG. 1, with control signals 108 designated A through D being connected to control line inputs 200 designated A through D, respectively. Control signals 108 may be connected directly to the respective control line inputs 200 (i.e., connected to the same electrical node), or may be connected indirectly by other circuit components such as an electrical isolator (not shown) or a relay driver (shown in FIG. 6).

Figure 3:
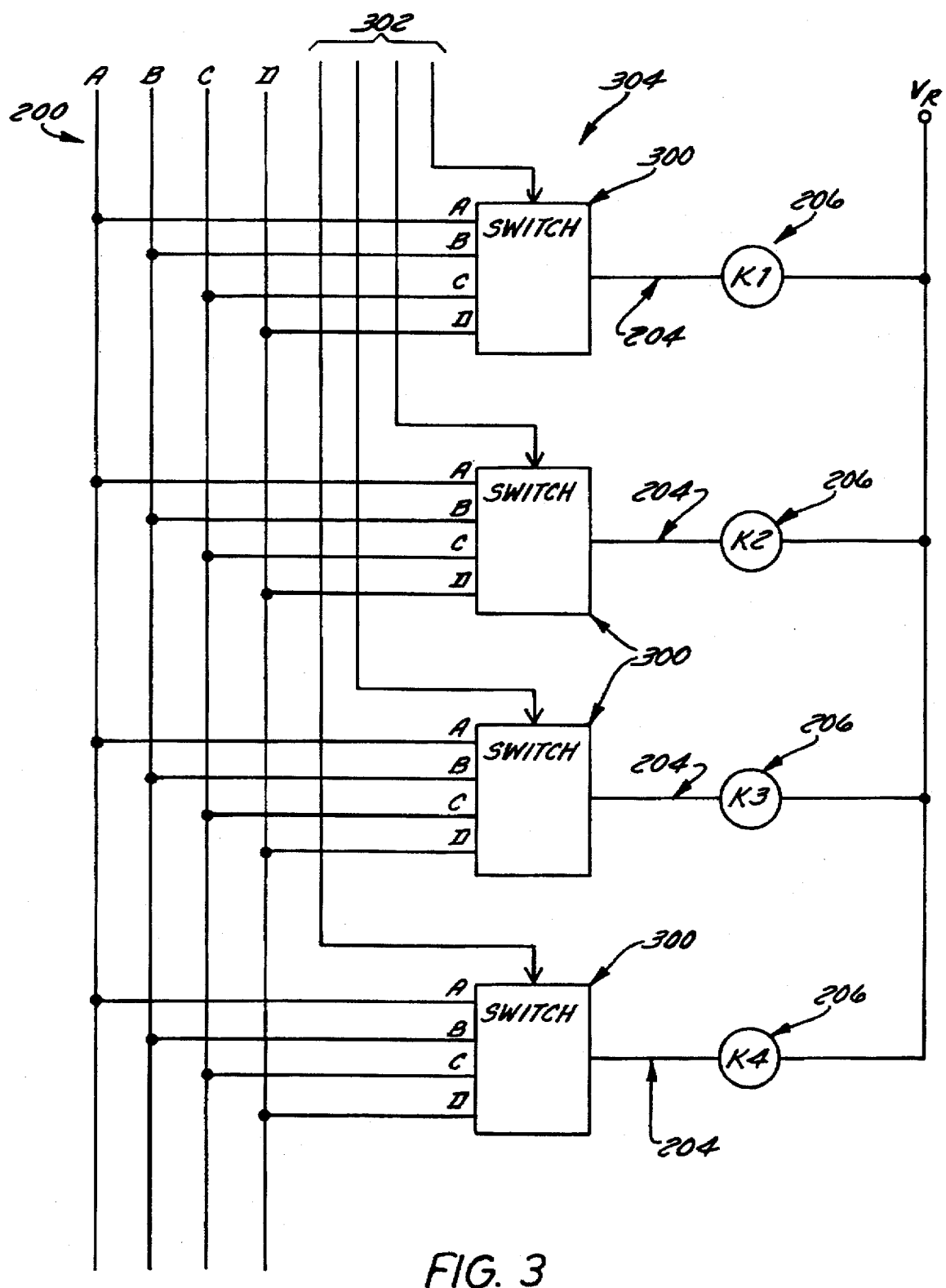
FIG. 3 is a block diagram of an electrical controller similar to the electrical controller of FIG. 2 except that the switching arrangement is configured by switch control inputs.

Switching arrangement 202 is coupled to the control line inputs 200 and to the control outputs 204, and includes a plurality of switches 208. Each switch 208 is coupled to the control line inputs 200 and to one control output 204, and is configured to selectively connect the one control output 204 to any one of the control line inputs 200. Although FIG. 2 shows each switch 208 coupled to all of the control line inputs 200, the controller could be configured to couple fewer than all of the control line inputs to each switch 208. In the preferred embodiment, switches 208 are manually switched and are implemented as multi-position slide switches. However, switches 208 could include other types of single-pole, multi-throw switches. In addition, as shown in FIG. 3, switches 208 could be replaced with switches 300 automatically controlled by switch control inputs 302. For example, if switch control inputs were output from processor 102 (shown in FIG. 1), switching arrangement 304 could be configured by processor 102 under software control and manual configuration of switches 208 would be unnecessary.

The block diagram of FIG. 2 shows electrical controller 110 in its default state with each switch 208 configured to couple each control line input 200 to one control output 204. In the default state, control line input A controls relay K1, control line input B controls relay K2, control line input C controls relay K3 and control line input D controls relay K4. If the switch 208 coupled to relay K1 is switched by the user from position A to position B, then control line input A would be coupled to zero control outputs and would not control any relay, and control line input B would be coupled to two control outputs 204 and would control relays K1 and K2. By selectively configuring switches 208, a user can selectively couple each control line input 200 to either zero, one or more than one control output 204, and can configure each control line input 200 to control either zero, one or more than one relay. Multiple relays 206 controlled by a common control line input 200 can be referred to as a gang of relays.

Each relay 206 is configured to control the application of an electrical signal 112 to electrical equipment 114 (see FIG. 1). In a preferred embodiment, each relay 206 is a single-pole, double-throw relay configured to control the application of electrical power to an electrical device. If switching arrangement 202 is configured such that one control line input 200 controls more than one relay, and each controlled relay is configured to control the application of a different phase of power to a multi-phase electrical device, then the single control line input 200 provides control over the electrical device without the need for multi-pole contactors. If switching arrangement 202 is configured such that one control line input 200 controls more than one relay, and each controlled relay is configured to control the application of electrical power to a different electrical device, then the single control line input 200 provides control over more than one electrical device.

Other types of binary switching devices may be used in place of relays 206 for other applications or uses of electrical controller 110. For example, the binary switching devices could include solenoids, power transistors or SCRs. Other types of electrically-actuated switches could be used.

Figure 4:
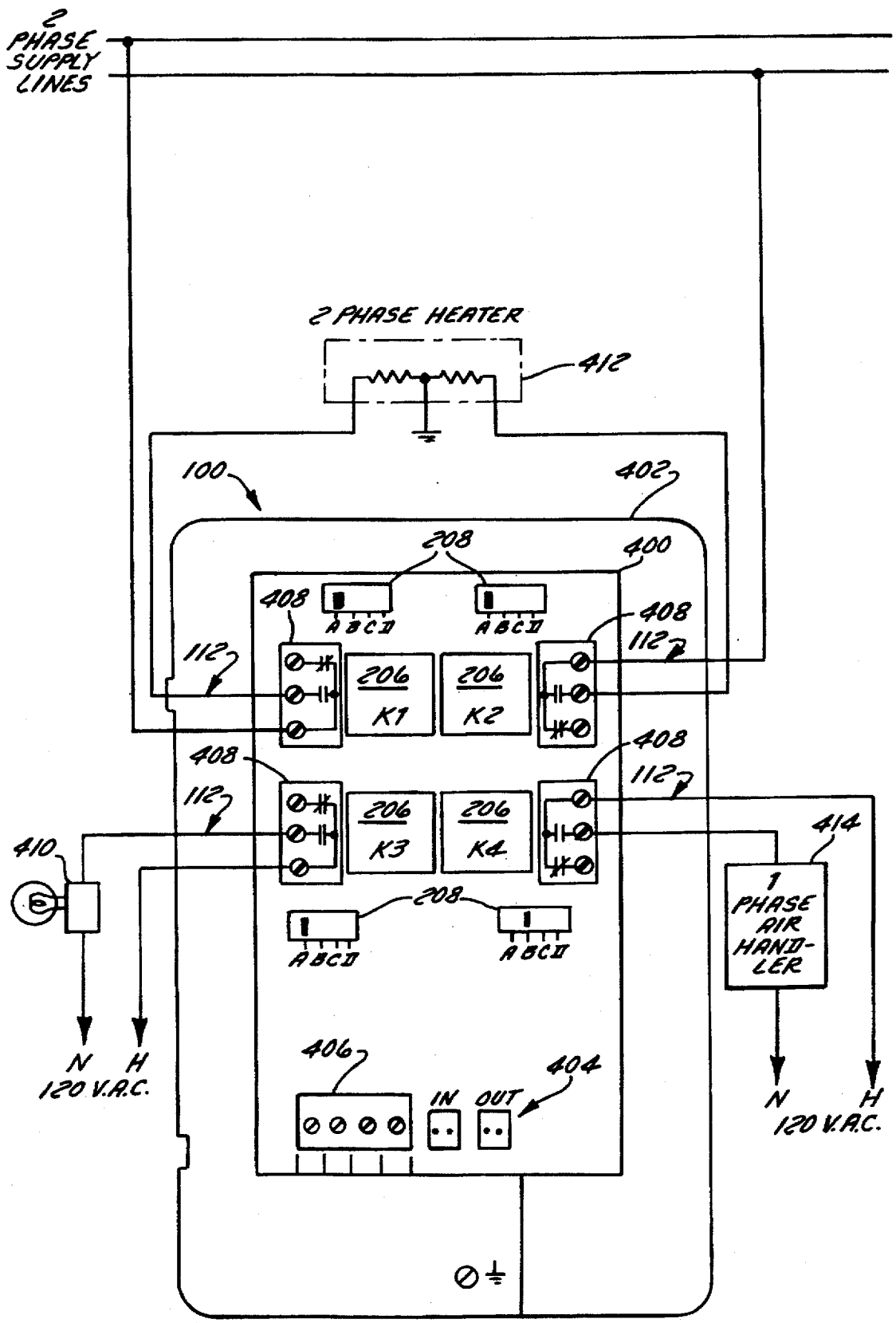
FIG. 4 is an exemplary installation diagram showing the relay output module of FIG. 1 configured to control a one-phase lamp and a two-phase heater according to identical time-of-day schedules and to configure a one-phase air handling unit according to a different time-of-day schedule.
Figure 5:
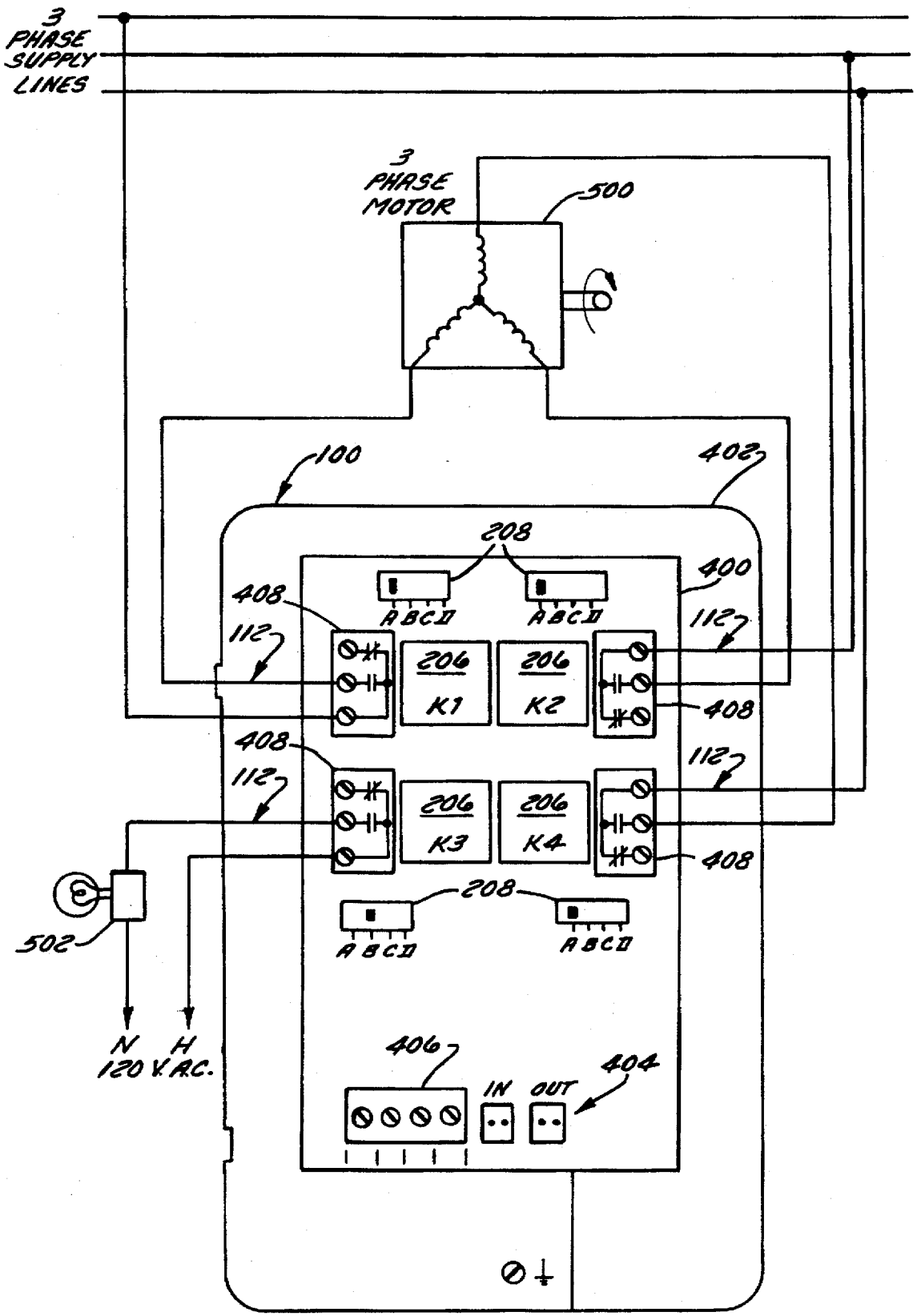
FIG. 5 is an exemplary installation diagram showing the relay output module of FIG. 1 configured to control a three-phase motor and a one-phase lamp according to different time-of-day schedules.

The functions of electrical controller 110 are best explained in reference to the exemplary installation diagrams of FIGS. 4 and 5. These figures show relay output module 100 installed in an EMU system. Relay output module 100 is implemented on a printed circuit board 400 mounted in a housing 402. Relay output module 100 includes input and output connectors 404 for network communication with an EMU controller (not shown) and a power connector 406 for receiving power from a power source (not shown). Relay output module 100 also includes relays 206 designated K1 through K4 as in FIG. 2. Each relay includes associated switch 208 and terminal block 408. Terminal blocks 408 are physically isolated from each other to electrically isolate the output signals. In FIG. 4, switches 208 are configured such that control line input A controls the application of electrical power to one-phase lamp 410 and two-phase heater 412, and control line input B controls the application of electrical power to one-phase air handling unit 414. In this example, only two control line inputs 200 are needed to control three pieces of equipment, with lamp 410 and heater 412 controlled according to identical time-of-day schedules and air handler 414 controlled according to a different time-of-day schedule. Two-phase heater 412 is controlled by two single-pole, double-throw relays, thereby eliminating the need for a double-pole, double-throw relay.

In the exemplary installation diagram of FIG. 5, relay output module 100 controls a three-phase motor 500 and a one-phase electrical lamp 502. Switches 208 are configured such that control line input A controls all three phases of power to motor 500 and control line input B controls the single phase of power to lamp 502. Three-phase motor 500 is controlled by three single-pole, double-throw relays, thereby eliminating the need for a triple-pole, double-throw relay.

Figure 6A:
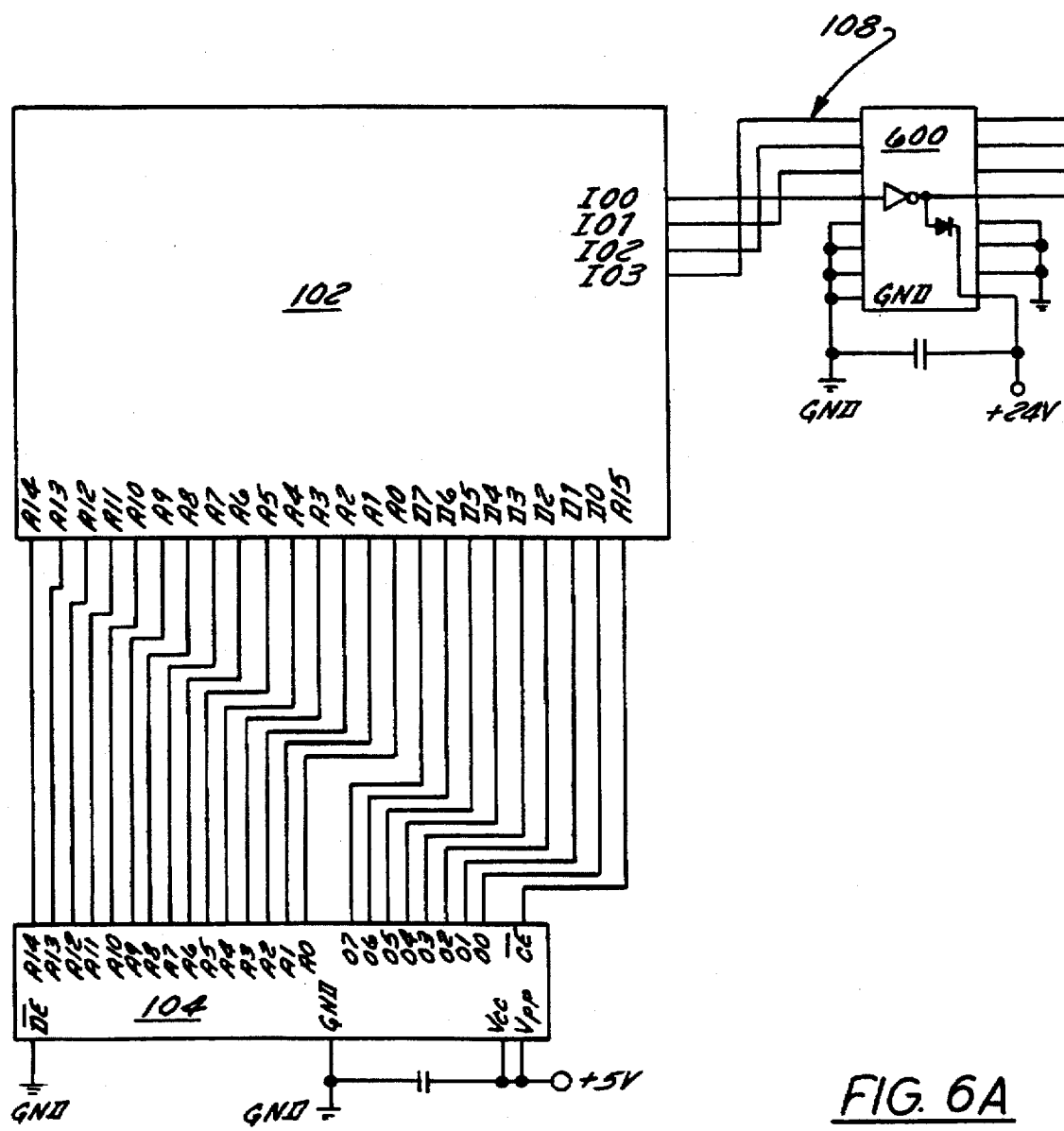
FIGS. 6A and 6B are an exemplary circuit schematic showing a portion of a relay output module including the processor, memory and electrical controller of FIG. 1.
Figure 6B:
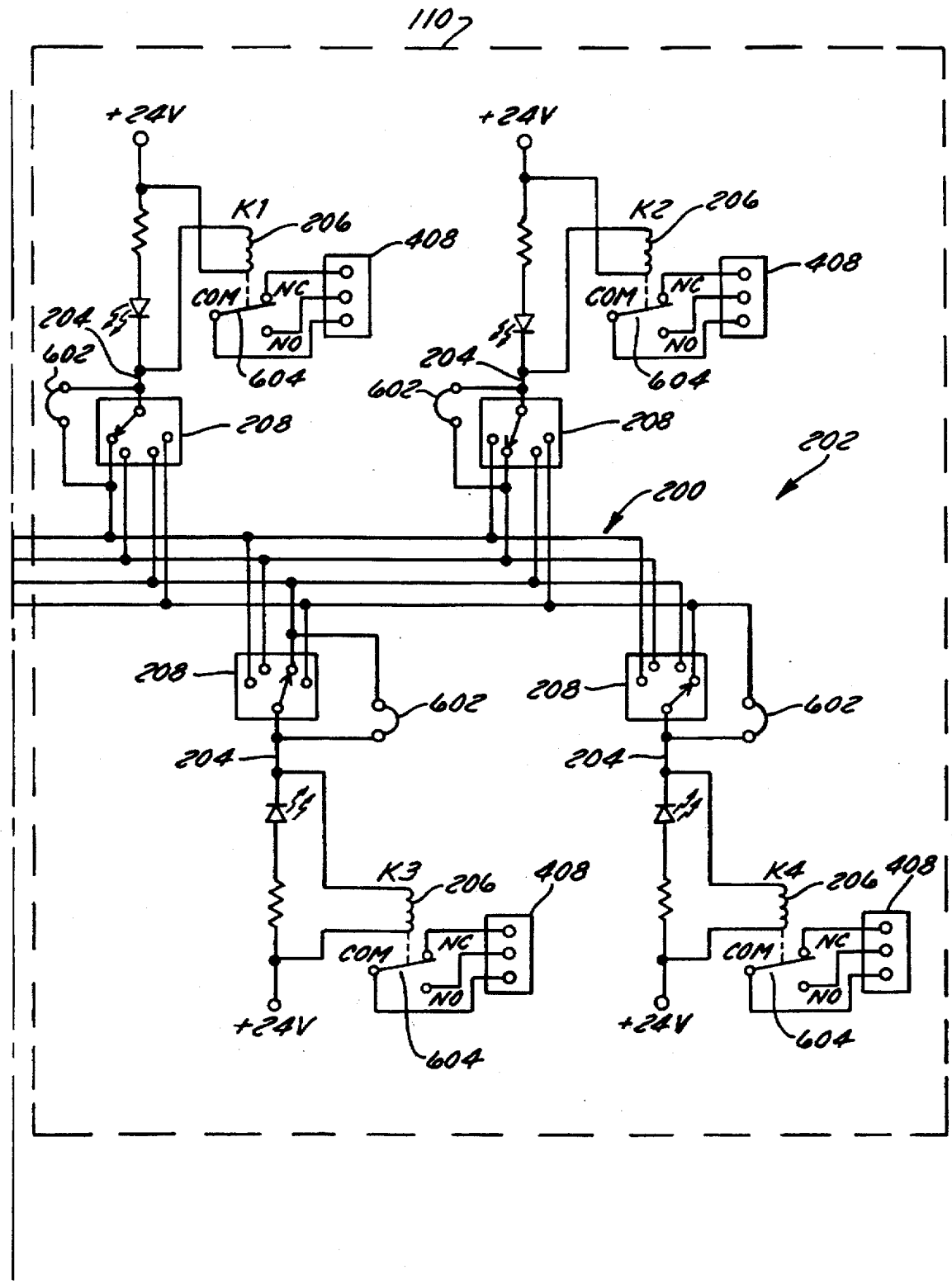

FIG. 6 shows an exemplary circuit schematic of a portion of relay output module 100 including processor 102, memory 104 and electrical controller 110. Processor 102 is a 3150 microprocessor which uses associated memory 104 to store communications protocol and application firmware. Memory 104 is a 27C256 EEPROM. Processor 102 generates control signals 108 using input/output pins IO0 through IO3 of the 3150 microprocessor. Control signals 108 are input to a relay driver circuit 600 implemented as a Motorola ULN2003A. Relay output module 100 uses four of the ULN2003A's seven NPN Darlington connected transistors to sink current when processor 102 activates control signals 108. The outputs from relay driver circuit 600 are control line inputs 200 to electrical controller 110. Each control line input 200 is connected to all four switches 208 in switching arrangement 202. Thus, switching arrangement 202 is configured to selectively couple each control line input 200 to either zero, one or more than one control output 204. The exemplary circuit of FIG. 6 also includes optional jumper wires 602. Jumper wires 602 are installed when switches 208 are not installed and vice-versa. Jumper wires 602 can replace any or all switches 208 to decrease the cost of relay output module 100 when known that a certain control line input 200 will control a certain relay 206. Each control output 204 is coupled to the winding of a relay 206 such that, when relay 206 is actuated, current flows from the 24V relay voltage through relay 206 and through switch 208 before being sunk by relay driver circuit 600. When a relay 206 is not energized, its movable contact or common 604 is in the normally closed position as shown in FIG. 6. In the normally closed position, a circuit is made from the common contact to the normally closed contact of terminal block 408. When the relay 206 is energized, movable contact 604 is pulled into the normally open position such that a circuit is made from the common contact to the normally open contact of terminal block 408. In this manner, the state of relay 206 controls the application of an electrical signal to the electrical equipment.

Figure 7:
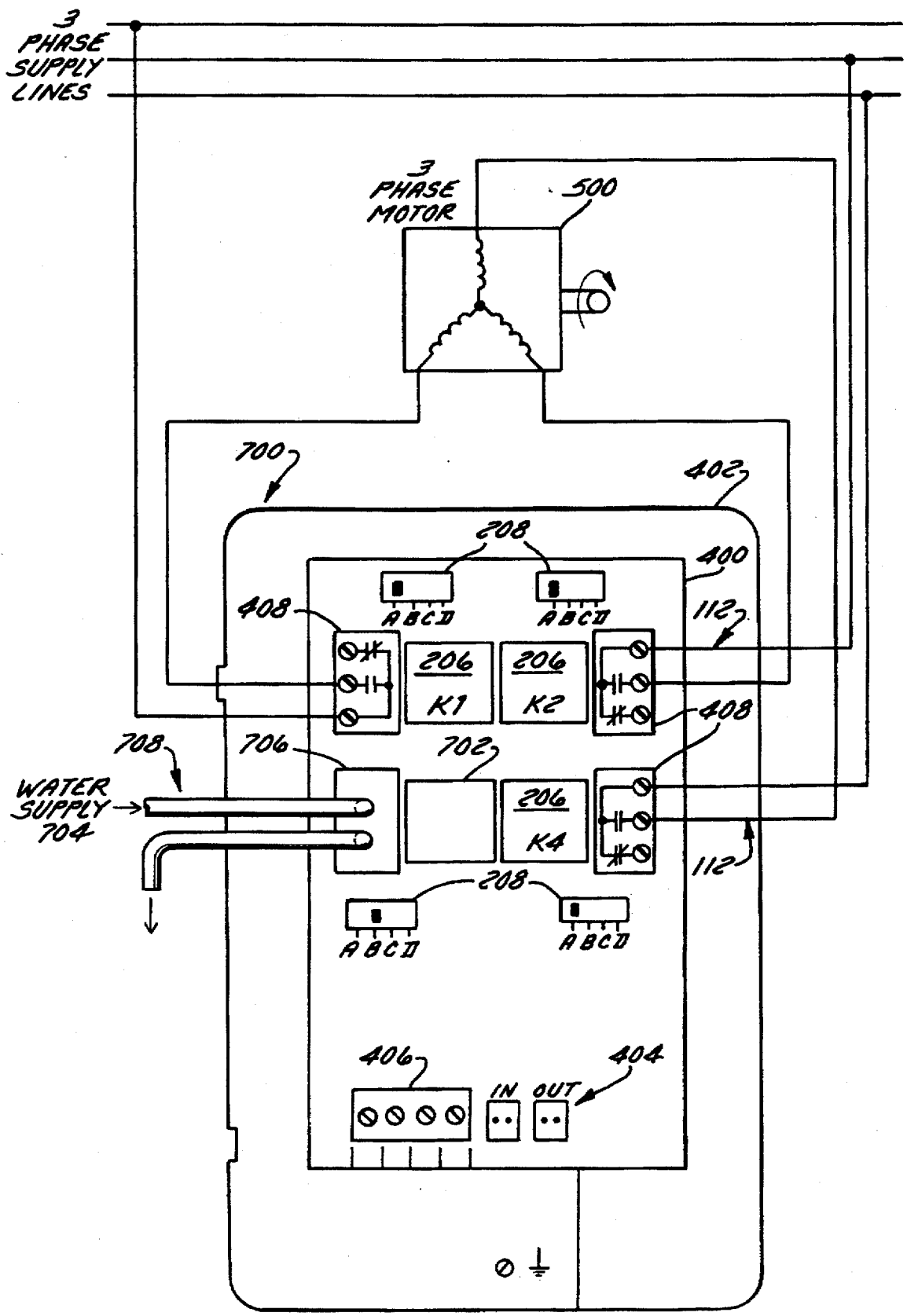
FIG. 7 is an exemplary installation diagram showing a solenoid and relay output module similar to the relay output module of FIG. 1 configured to control a three-phase electrical motor according to one control signal and a water supply according to a second control signal.

FIG. 7 is an exemplary installation diagram of a solenoid and relay output module 700 similar to FIG. 5 except that module 700 is configured with a solenoid 702 to control a water supply 704 instead of being configured with a relay 206 to control a lamp 502. Solenoid 702 is coupled to a mechanical valve 706 for controlling the flow of water (not shown) through hose 708. Switches 208 are configured such that control line input A controls all three phases of power to motor 500 and control line input B controls the flow of water from water supply 704 through hose 708. In an apparatus such as a machine tool, solenoid and relay output module 700 would enable a single control line input 200 to control both a grinding or drilling motor and an associated cooling water supply. A solenoid coupled to a mechanical device could be used to control the flow of other liquids, gases or viscous solids. An electrical controller 110 could include any combination of relays or solenoids for controlling a variety of electrical and non-electrical equipment.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. An electrical controller for controlling electrical equipment in accordance with a plurality of control signals received by the controller comprising:

a plurality of control line inputs coupled to the control signals;

a switching arrangement coupled to the control line inputs;

a plurality of control outputs coupled to the switching arrangement wherein the switching arrangement is configured to selectively couple each control line input to zero control outputs, one control output and more than one control output; and a plurality of binary switching devices coupled to the control outputs and to the electrical equipment, each binary switching device being actuatable in response to one of the control outputs and configured to control the application of an electrical signal to the electrical equipment.

2. The controller of claim 1 wherein the switching arrangement comprises a plurality of switches, each switch coupled to at least two control line inputs and to one control output whereby the one control output can be selectively connected to any one of the at least two control line inputs.

3. The controller of claim 2 wherein the switches are manually switched.

4. The controller of claim 2 wherein the switches include multi-position slide switches.

5. The controller of claim 2 wherein the switches include single-pole, multi-throw switches.

6. The controller of claim 1 further comprising a plurality of switch control inputs coupled to the switching arrangement, wherein the switch control inputs control the configuration of the switching arrangement.

7. The controller of claim 6 wherein the switching arrangement comprises a plurality of switches, each switch being coupled to at least two control line inputs, one switch control input and one control output, wherein the configuration of the switch is controlled by the switch control input to selectively connect the control output to any one of the at least two control line inputs.

8. The controller of claim 1 wherein the binary switching devices are single-pole, double-throw relays.

9. The controller of claim 1 wherein the binary switching devices are configured to control the application of electrical power to the electrical equipment.

10. The controller of claim 1 wherein the configuration of the switching arrangement allows one control line input to actuate more than one binary switching device, and each of the more than one binary switching device actuated by the control line input controls the application of a different phase of electrical power to an electrical device.

11. The controller of claim 1 wherein the configuration of the switching arrangement allows one control line input to actuate a gang of binary switching devices to control the application of electrical power to a two-phase electrical device.

12. The controller of claim 1 wherein the configuration of the switching arrangement allows one control line input to actuate a gang of binary switching devices to control the application of electrical power to a three-phase electrical device.

13. The controller of claim 1 further comprising a plurality of isolated output contacts associated with each binary switching device to electrically isolate the electrical signals controlled by each binary switching device.

14. The controller of claim 13 wherein the isolated output contacts are physically isolated from each other.

15. An electrical controller for controlling equipment in accordance with a plurality of control signals received by the controller comprising:

a plurality of control line inputs coupled to the control signals;

a switching arrangement coupled to the control line inputs;

a plurality of control outputs coupled to the switching arrangement wherein the switching arrangement is configured to selectively couple each control line input to zero control outputs, one control output and more than one control output; and a plurality of binary switching devices coupled to the control outputs and to the equipment, each binary switching device being actuatable in response to one of the control outputs and configured to control the equipment.

16. The controller of claim 15 wherein the binary switching devices include at least one relay for controlling the application of electrical power to an electrical device.

17. The controller of claim 15 wherein the binary switching devices include at least one solenoid coupled to a mechanical device.

18. The controller of claim 15 wherein the binary switching devices include at least one solenoid coupled to a valve.

19. The controller of claim 15 wherein the binary switching devices include a combination of relays and solenoids.

20. The controller of claim 15 further comprising a plurality of switch control inputs coupled to the switching arrangement, wherein the switch control inputs control the configuration of the switching arrangement.

21. An electrical controller for controlling a plurality of electrical devices, each electrical device controlled in accordance with one input selected from a plurality of inputs, the controller comprising:

means for selectively coupling each input to zero control outputs, one control output and more than one control output; and a plurality of output means for generating electrical signals applied to the electrical devices in response to the control outputs.

22. The controller of claim 21 wherein, when one input is coupled to more than one control output, the one input controls the application of multiple phases of electrical power to one of the electrical devices.

23. The controller of claim 21 wherein, when one input is coupled to more than one control output, the one input controls the application of electrical power to more than one electrical device.

* * * * *